United States Patent [19]

Bricot et al.

[11] 4,203,133

[45] May 13, 1980

[54] OPTICAL PLAYER WITH HALF WAVE PLATE

[75] Inventors: Claude Bricot; Jean-Claude Lehureau, both of Paris, France

[73] Assignee: Thomson-Brandt, Paris, France

[21] Appl. No.: 673,057

[22] Filed: Apr. 2, 1976

[30] Foreign Application Priority Data

Apr. 4, 1975 [FR] France .............. 75 10624

[51] Int. Cl.² ............................ H04N 5/76
[52] U.S. Cl. ................. 358/128.5; 179/100.3V; 250/201
[58] Field of Search ............. 358/128, 227; 179/100.3 V, 100.3 G, 100.3 B, 100.3 K, 100.3 GN; 360/77; 340/173 LM, 173 LT; 250/225, 201, 202, 570; 350/157; 365/121

[56] References Cited

U.S. PATENT DOCUMENTS

| 3,501,586 | 3/1970 | Russell | 179/100.3 V |
| 3,663,763 | 5/1972 | Trost | 360/70 |
| 3,875,401 | 4/1975 | Stauffer | 250/225 |
| 3,876,841 | 4/1975 | Kramer | 179/100.3 V |
| 3,931,459 | 1/1976 | Korpel | 179/100.3 V |
| 3,932,700 | 1/1976 | Snopko | 179/100.3 V |
| 3,971,002 | 7/1976 | Bricot | 179/100.3 V |
| 3,975,630 | 8/1976 | Zorn | 179/100.3 V |

OTHER PUBLICATIONS

University Physics, by Sears and Zemansky, Addison-Wesley Publishing Co. Inc., ©1962, pp. 877–878.

Primary Examiner—Bernard Konick
Assistant Examiner—Alan Faber
Attorney, Agent, or Firm—Cushman, Darby & Cushman

[57] ABSTRACT

The present invention relates to the reading out of a track by means of a light spot which scans a track along which the information contained in a record is transcribed. The object of the invention is a read-out system which ensured focussing and tracking by the synchronous detection of positional errors with the help of a read-out beam one of the halves of which is intercepted by a half-wave plate; an oscillatory motion is imparted to the read-out spot in the plane containing the track.

11 Claims, 10 Drawing Figures

OPTICAL PLAYER WITH HALF WAVE PLATE

The present invention relates to systems which make it possible to read a track along which there has been transcribed a carrier wave angularly modulated by information-bearing signals. It relates more particularly to systems in which a read out head projects convergent radiation onto that face of the data carrier which contains the track to be read out, in order to illuminate the data carrier with a read-out spot which is as concentrated as possible and scans the track substantially point fashion. In view of the fact that the track width and the size of the read-out spot are comparable with the wavelength of the read-out radiation, the diffracted radiation emerging from the illuminated portion of the track experiences a more or less pronounced degree of spreading out or scattering. Photo-electric elements arranged in the read-out head in order to selectively pick up the diffracted radiation electrically reproduce the transcribed wave; the latter, after demodulation, reconstitutes the signals recorded on the data carrier. The data carrier may, by way of non-limitative example, take the form of a disc carrying a spiral track. Information transcription can be performed by the production of a relief impression but equally well by the use of a procedure employing non-uniform transmission or reflection of the read-out radiation.

When a data carrier moves in front of the read-out head, it is necessary that the point of convergence of the read-out radiation should coincide accurately with the face within which the track is located and it is necessary, too, that it should remain centered thereon. Any displacement of the read-out head in relation to the data carrier may have the effect of displacing the spot away from the longitudinal axis of the track in directions perpendicular thereto, which correspond in the one case to defocussing of the spot and in the other to the creation of an eccentric condition mistracking. The maintaining of the read-out spot in a focussed and centered position, therefore implies the need for means which tend to cancel out the aforementioned kinds of errors, by appropriate feed back loops.

The optical detection of positional errors on the part of the point of convergence of the read-out beam in relation to the longitudinal axis of the track, is performed by eccentricity and/or defocussing sensors.

The known optical sensors which detect eccentricity using a single beam, only operate for certain track depths, in the case of a relief track, and they are not designed to operate with tracks in which the mode of transcription is based upon non-uniform transmission or reflection. Eccentricity sensors exist which utilise several separate beams but these complicate the design of the reader device. Known types of defocussing sensors have recourse to the technique of measuring the phase-shift in signals read-out at either side of the optical axis, using two photo-detectors, but the focal point thus defined is not insensitive to the depth of the track. Again, there is a mode of operation which consists in causing the objective lens responsible for projecting the read-out radiation to oscillate in such a way that the point of convergence scans a zone extending to either side of the plane containing the track, however the drawback of this method of scanning is that it produces an audible noise component due to the oscillatory motion of the lens.

In an effort to overcome these drawbacks, the invention provides for the utilisation of a single read-out beam which is given a low amplitude oscillatory motion producing displacement of the point of convergence parallel to the face containing the track and within a range extending to either side of the longitudinal axis of the latter. A half-wave plate partially intercepts the read-out beam, splitting it into two contiguous half-beams each illuminating a photo-detector element. Synchronous detector means connected to these photo-detector elements deliver signals representing the eccentricity and defocussing of the read-out spot.

In accordance with the present invention, there is provided a system for reading out a record by point optical scanning of a diffractive track carried by said record, and along which information items are transcribed, said system comprising: means causing said record to displace in front of a read-out head; said read-out head comprising a source furnishing monochromatic radiation, and optical means focussing said monochromatic radiation for forming a read-out beam; said read-out beam having a point of convergence positioned, close to the optical axis of said optical means, and in immediate proximity of the element of said diffractive track being read at the time; said read-out head further comprising at least two photo-detector elements picking up the radiation emerging from the illuminated portion of said diffractive track; said system further comprising deflection means for deflecting said read-out beam positioned between said source and said record for causing said point of convergence to displace transversely in relation to the longitudinal axis of said diffractive track; a half-wave plate intercepting one of the halves of said read-out beam; said halves being obtained by partitioning said read-out beam with a plane containing said optical axis and perpendicular to the direction of displacement of said point of convergence; an electrical generator being connected to said deflection means for imparting to said point of convergence an oscillatory motion; synchronous detector means being connected to said electrical generator and to said photo-detector elements for supplying signals representing positional errors on the part of said point of convergence, in relation to said longitudinal axis.

For a better understanding of the present invention, and to show how the same may be carried into effect, reference will be made to the ensuing description, and the following drawings among which:

FIGS. 2, A-E, 3, a & b and 4, a & b are explanatory diagrams pertaining to the operation of the system shown in FIG. 1.

Figure 1:
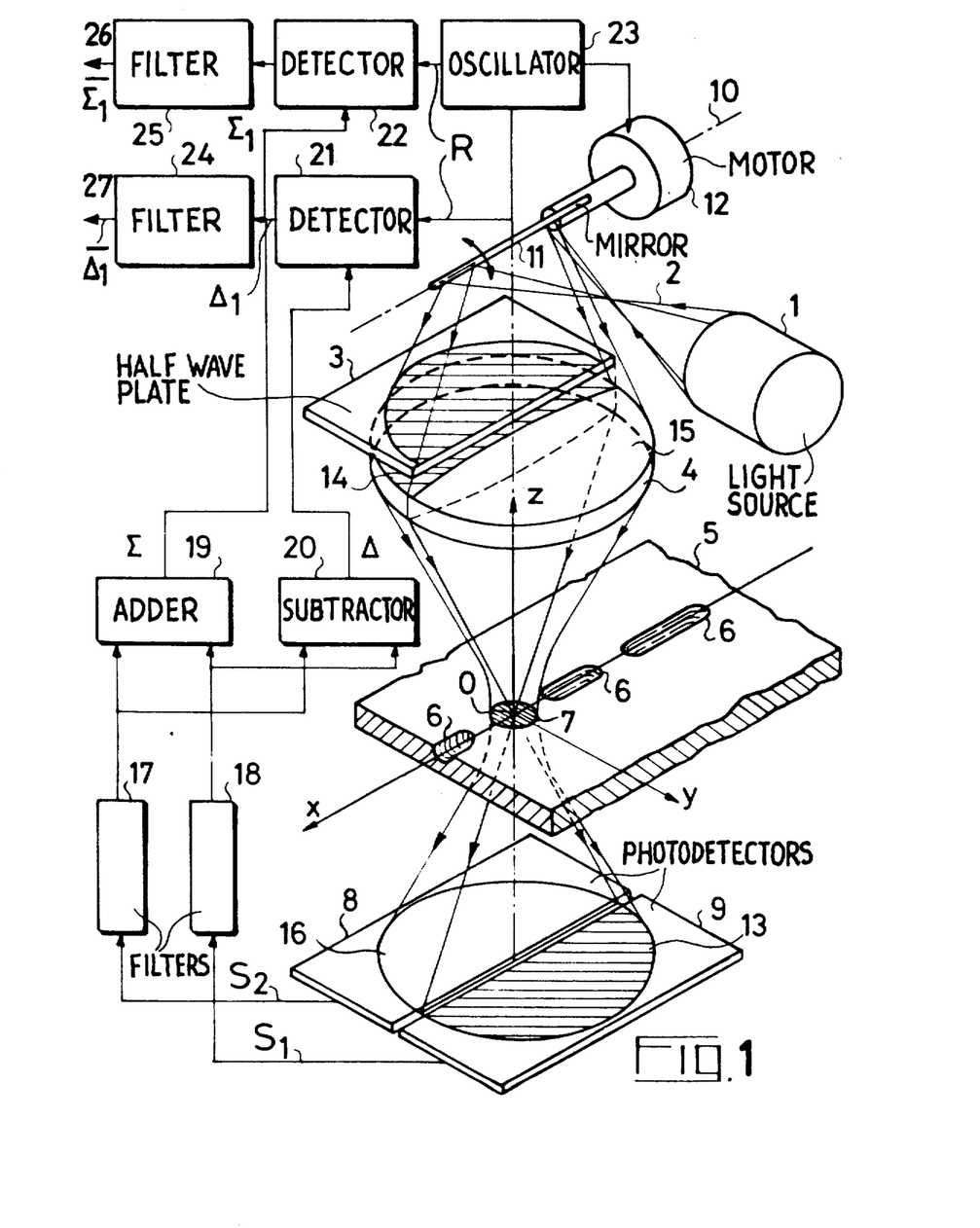
FIG. 1 is an isometric view of the read-out system in accordance with the invention.

FIG. 1 shows a radiation source 1 which emits a read-out beam 2 of wavelength λ, towards an oscillating mirror 11. The mirror 11 pivots about an axis 10 and directs onto a projection lens 4 the read-out radiation coming from the source 1. The oscillatory motion of the mirror 11 is controlled by a drive element 12 supplied from the oscillator 23 with an alternating voltage of frequency f. The objective lens 4 focusses the read-out radiation at the point of convergence 0 which latter experiences an alternating displacement of frequency f directed along the axis y of a reference system of coordinates o x y z.

The focal plane of the read-out beam is the plane x o y which must be maintained in coincidence with the face 5 of a data carrier used for the recording function. The face 5 contains a track whose longitudinal axis is defined by ox. This track, by way of non-limitative example, is constituted by a succession of microscopic depressions 6. These pits have a substantially constant width but their non-uniform lengths and spacings make it possible to reproduce the sequence of alternations in a carrier wave angularly modulated by the information which it is desired to read-out. At the time of read-out of the track 6, the spot 7 scans the latter as a consequence of the displacement of the data carrier 5 in the direction x. In the case of a data carrier 5 in the form of a disc carrying a spiral track, the displacement is produced by means of a device which has not been shown but whose axis of rotation is parallel to oz and intersects the radial direction oy. In the case of a spiral recording, scanning of the track requires radial displacement of the spot 7 as the data carrier 5 rotates. To this displacement there is added the oscillation of the spot 7 under the control of the oscillating mirror 11. With each revolution of the data carrier 5, the displacement is equal to the pitch of the spiral track and since only one turn of the spiral is to be read at a time, the peak-to-peak amplitude of the oscillation of the spot 7 is made less than twice the pitch. FIG. 1 relates to the case of the data carrier 5 read by transmission. The two photo-detector elements 8 and 9 pick up the read-out radiation when it has passed across the transparent data carrier 5.

In accordance with the invention, a half-wave plate 3 intercepts that fraction of the read-out radiation which ultimately goes to the photo-detector element 9. The other fraction of the read-out radiation ultimately reaches the photo-detector element 8. In accordance with a preferred arrangement, the read-out beam is split into two beam halves along a plane of section xoy which contains the longitudinal axis ox of the track 6 and the optical axis oz of the objective lens 4. In this case, the half-wave plate 3 intercepts the half-beam whose right sections are defined by the cross-hatched half-disc 14 at the level of the objective lens 4 and the cross-hatched half-disc 13 at the level of the photo-detector element 9. The other half-beam, which is not intercepted by the half-wave plate 3, has right sections defined by the half-disc 15 level with the objective lens 4 and the half-disc 16 level with the photo-detector element 8. It will be observed that the half-wave plate 3 is designed in order to intercept the radiation incident upon the data carrier 5.

It will be observed also that the interval separating the photo-detector elements extends to either side of the plane of section xoy.

The voltages $S_1$ and $S_2$ furnished by the photo-detector elements 8 and 9 are applied to filters 17 and 18 which eliminate the carrier wave whose lowest frequency has a value higher than the top limit of the band of frequencies within which the positional feed back loops operate. The filtered voltages coming from the filters 17 and 18 are applied to an adder circuit 19 and to a subtractor circuit 20. Synchronous detectors 21 and 22 have their first inputs connected to the oscillator 23 and their second inputs are supplied respectively with the difference and sum signals coming from the circuits 20 and 19. The outputs of the synchronous detectors 21 and 22 respectively supply low-pass filters 24 and 25 at the outputs 26 and 27 of which signals are picked off the algebraic amplitude of which represents the defocussing and eccentricity of the point of convergence 0 of the read-out beam, respectively.

For convenience and ease of understanding in FIG. 1, the two servo-loops connected to the outputs 26 and 27 and acting on the one hand on the motor 11 and on the other on a motor which has not been shown but which is used to adjust the focussing of the read-out beam, have not been shown.

Figure 5:
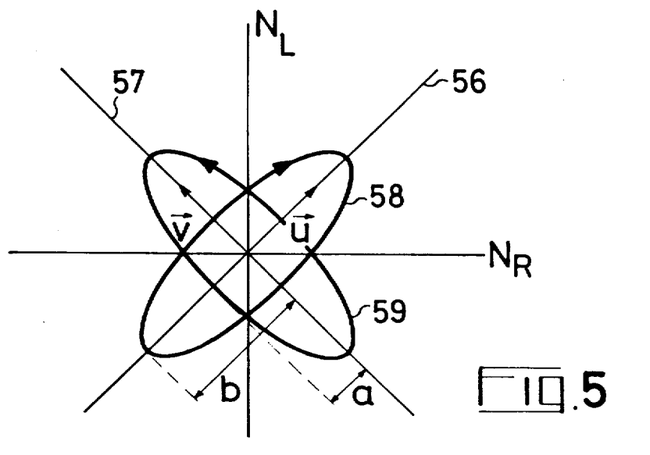
FIG. 5 illustrates the way in which the read-out radiation is polarized in the two halves of the projected beam.

Due to the presence of the half-wave plate 3, the two read-out half-beam have different optical polarizations. FIG. 5 relates to the case of a light source 1 emitting elliptically polarized radiation 58. The major axis 56 and the minor axis 57 of the ellipse 58, which characterise the polarization of the light wave, are oriented at 45° to the neutral axes $N_L$ and $N_R$ of the half-wave plate 3. The end of the vibration vector describing the incident optical wave, describes the ellipse in the clockwise sense and its amplitude varies between the values a and b. The wave emerging from the half-wave plate 3 has an elliptical polarization defined by the ellipse 59 in which the vector rotation is the reverse of that previously described. After passing the half-wave plate, the polarized radiation contained in the two half-beams are optically decoupled. If $\vec{u}$ and $\vec{v}$ are the unit vectors carried by the axes 56 and 57 of the ellipse 58, then it is possible to mathematically express the vibrational amplitude $\vec{V}$ resulting from the sum of the two vibrations $\vec{V}_1$ and $\vec{V}_2$; one of these vibrations $\vec{V}_1$ is contained in the half-beam which does not involve the half-wave plate whilst the other of these vibrations $\vec{V}_2$ is present in the other half-beam and it is assumed that in addition to passing through the half-wave plate 3 it has experienced a phase-shift $\phi$.

We then obtain: $\vec{V}=\vec{V}_1+\vec{V}_2$ or, again $\vec{V}=a\vec{v}e^{j\pi/2}+b\vec{u}+(a\vec{u}+b\vec{v}e^{-j\pi/2})\ e^{j\phi}$. and, finally: $\vec{V}=(ae^{j\phi}+b)\vec{u}+(a-be^{j\phi})e^{j\pi/2}\vec{v}$.

The illumination resulting from the mixing of the light vibrations $\vec{V}_1$ and $\vec{V}_2$ is proportional to:

$$|\vec{V}|^2 = |(ae^{j\phi}+b)|^2 + |(a-be^{j\phi})|^2$$

which we can write as:

$$|\vec{V}|^2 = a^2 + b^2 + 2ab\cos\phi + a^2 + b^2 - 2ab\cos\phi.$$

and, finally:
$$|\vec{V}|^2 = |\vec{V}_1|^2 + |\vec{V}_2|^2.$$

This latter equation shows that the radiations contained in the two half-beams simply add their intensities. The radiations do not interfere with one another.

Referring to FIG. 1 in which the photo-detector cells 8 and 9 respectively intercept the zero order component of the two half-beams, it is possible to deduce from the property of non-interference, that when a micro depression 6 encounters one of the two half-beams, the diffractive effect which it produces gives rise to a substantial reduction in the luminous intensity received by the cell corresponding to this half-beam but the diffracted light reaching the other cell has virtually no effect upon the value of the illumination which it receives.

The non-interference property which has just been discussed, is fully apparent when using a polarized read-out source.

More often than not, the read-out source is constituted by a laser emitting polarized light. However, if it is a non polarized laser which is involved, the light emission is constituted by two modes which are polarized circularly and in opposite directions; the result is that the non-interference property which ensures optical decoupling of the two half-beams, remains intact.

Figure 2:
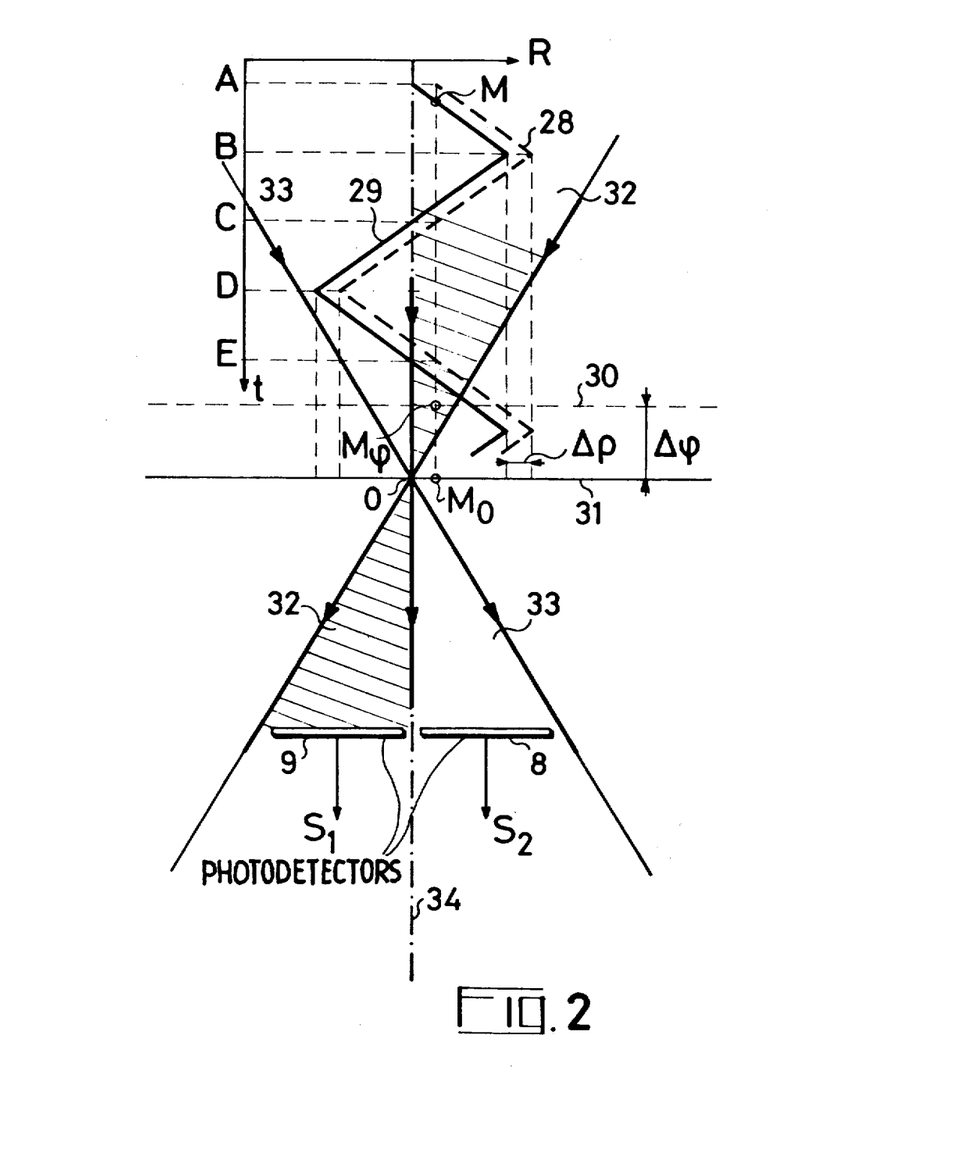
Figure 3:
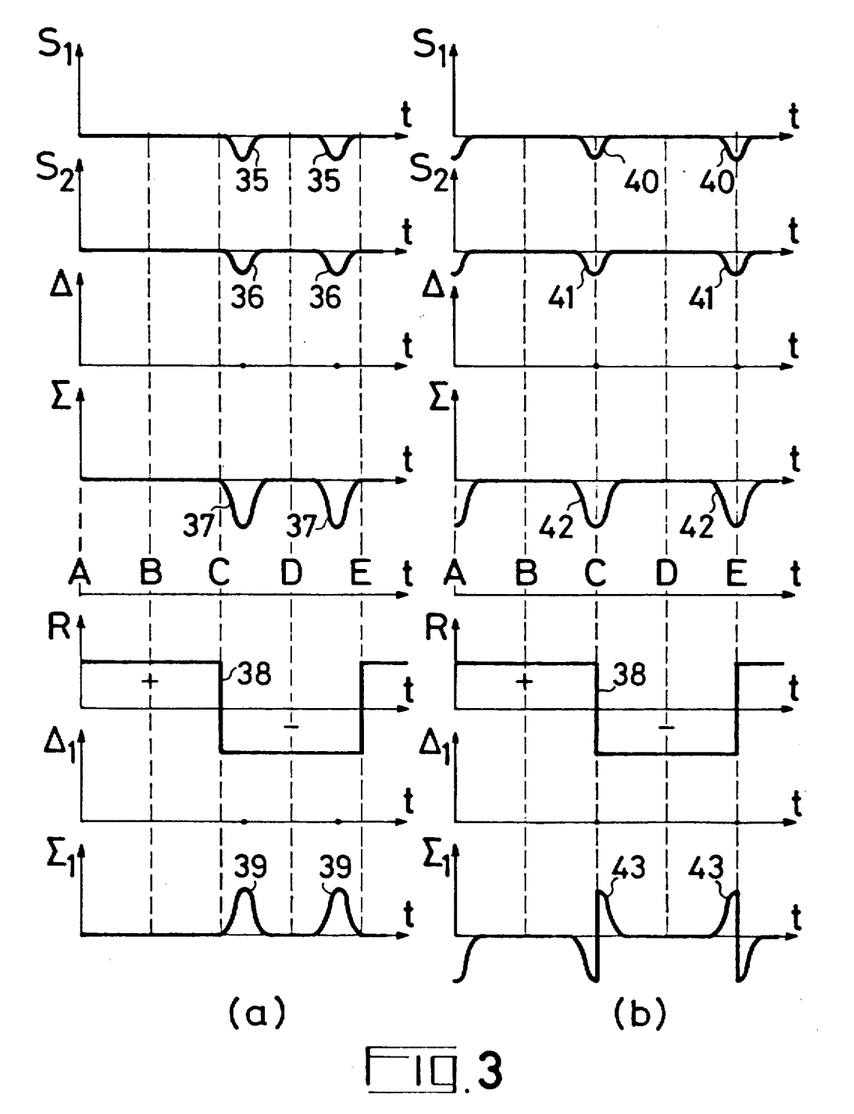
Figure 4:
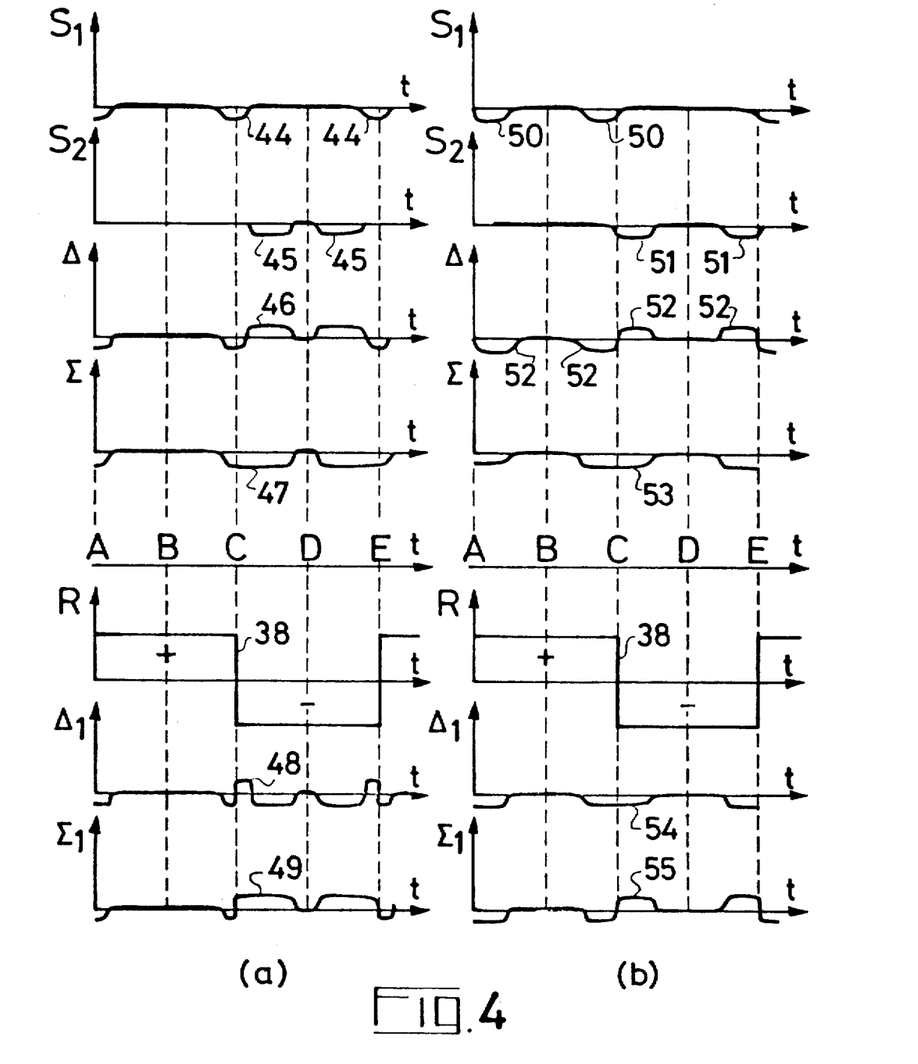

The operation of the read-out device shown in FIG. 1 can be understood from the diagrams of FIGS. 3 and 4. In FIG. 2, a symmetrical sawtooth has been used to illustrate the alternating displacement imparted to the read-out beam by the oscillating mirror 11, however it is easier in this illustration to show the half-beams 32 and 33 as if they were fixed and to imagine a data carrier element as performing the requisite alternating displacement along the axis oy. Self-evidently, the displacement could be performed in accordance with some other law than that shown in FIG. 2.

The plane of FIG. 2 corresponds to the plane YOZ of FIG. 1. The two half-beams 32 and 33 are separated from one another by the plane XOZ whose line 34 has been shown in broken-line. In the ideal focussing position, the surface of the data carrier is illustrated by the line 31 which passes through the centre of convergence 0 of the two beam halves. If a defocussing situation of amplitude $\Delta\phi$ occurs, the line 30 is substituted for the line 31. On the line 30, a track element $M_o$ has been shown, the instantaneous position of which is obtained by projection parallel to the axis 34, of the imaginary point M of the wave 29 which translates the alternating motion effectively imparted to the read-out beam, in the system of coordinates (R, t). In the case of an eccentricity $\Delta\rho$ on the part of the read-out spot in relation to the track, on the other hand, it is necessary to consider the wave 28 shown in broken line. The point $M\phi$ represents the track element in the case of a defocussing by $\Delta\phi$.

FIG. 2 makes it possible to justify the shape of the signals $S_1$ and $S_2$ respectively furnished by the photodetectors 9 and 8, by adopting as markers on the time axis t, the instants A, B, C, D and E.

In FIG. 3, at (a) the shape of the signals $S_1$ and $S_2$ has been illustrated for the hypothetical situation that only an eccentricity $\Delta\rho$ exists. Thus, in FIG. 2, we will consider the wave 28 and the projection $M_o$ onto the line 31. It will be seen that the signal $S_1$ experiences a transitory drop in strength 35 between the instants C, D and D, E. A transitory drop in strength 36 occurs in the signal $S_2$, of the same value. The difference $\Delta$ between the signals $S_1$ and $S_2$ is zero and the sum of the signals $S_1$ and $S_2$ exhibits a transitory drop 37 the value of which is twice that of the equal drops affecting the signals $S_1$ and $S_2$. The synchronous demodulating signal 38 applied to the synchronous demodulators 21 and 22 has also been shown at (a) in FIG. 3 with its positive and negative alternations. The signals $\Delta_1$ and $\Sigma_1$ furnished respectively by the demodulators 21 and 22 are also shown at (a) in FIG. 3. It will be seen that the error $\Delta\rho$ corresponding to the eccentricity of the spot left of the track, has given rise to a signal $\Sigma_1$ of positive mean value $\overline{\Sigma}_1$; the signal $\Delta_1$ has a mean value $\overline{\Delta}_1$ which is zero since the error $\Delta\phi$ which measures the defocussing, is zero in the case under consideration.

By analogy, FIG. 3 illustrates at (b) the shape of the signals $S_1$, $S_2$, $\Delta$, $\Sigma$, $\Delta_1$ and $\Sigma_1$ when the errors $\Delta\phi$ and $\Delta\rho$ are zero. To analyse this situation, reference must be made to the wave 29 and to the projected line 31 of FIG. 2. It will be observed that the mean values $\overline{\Sigma}_1$ and $\overline{\Delta}_1$ of $\Delta_1$ and $\Sigma_1$, are zero.

In FIG. 4, at (a) the shape of the signals $S_1$, $S_2$, $\Delta$, $\Sigma$, $\Delta_1$ and $\Sigma_1$, when the errors $\Delta\phi$ and $\Delta\rho$ are both other than zero, has been shown. The mean value $\overline{\Delta}_1$ of $\Delta_1$ is negative and that $\overline{\Sigma}_1$ of $\Sigma_1$ is positive, as in the case (a) shown in FIG. 3.

In FIG. 4, at (b), the shape of the signals $S_1$, $S_2$, $\Delta$, $\Sigma$, $\Delta_1$, and $\Sigma_1$ has been shown for the case in which only the error $\Delta\phi$ exists. The mean value $\overline{\Delta}_1$ of $\Delta_1$ is still negative but that $\overline{\Sigma}_1$ of $\Sigma_1$ is zero.

Concluding from the earlier analysis, there is obtained at the output 26 of the filter 25 shown in FIG. 1, a signal $\Sigma_1$ which represents in magnitude and sign the eccentricity error $\Delta\rho$ in the spot, in relation to the track being read-out. At the output 27 of the filter 24 a signal $\overline{\Delta}_1$ is obtained whose magnitude and sign represent the focussing error $\Delta\phi$ in the read-out spot.

The signals $\Sigma_1$ and $\Delta_1$ are used to control feed-back loops designed to maintain the spot focussed and keep it following the track.

Figure 7:
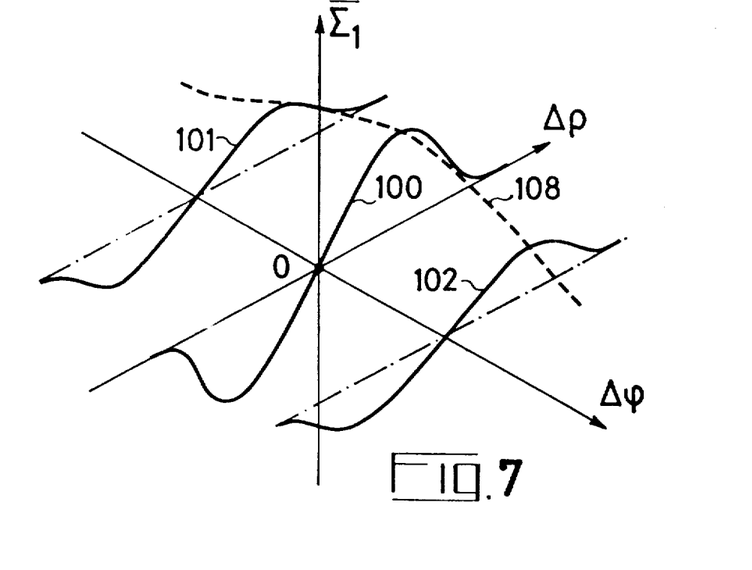
FIGS. 7 and 8 are explanatory diagrams pertaining to the operation of the read-out system shown in FIG. 1.

In FIG. 7, discrimination curves pertaining to the signal $\Sigma_1$ in relation to different values of the defocussing $\Delta\phi$ and the eccentricity $\Delta\rho$, have been shown. For $\Delta\phi=0$ a discrimination curve 100 is obtained whose slope is high in the central zone passing through the origin 0. For positive and negative values of $\Delta\phi$, similar curves 102 and 101 are obtained. The peaks in the curves 100 and 101 and 102 lie on a humped curve 108 whose maximum corresponds to the value $\Delta\phi=0$. Control of track-following is therefore effective whatever the defocussing of the spot but an increased loop gain is achieved when focussing is acquired.

Figure 8:
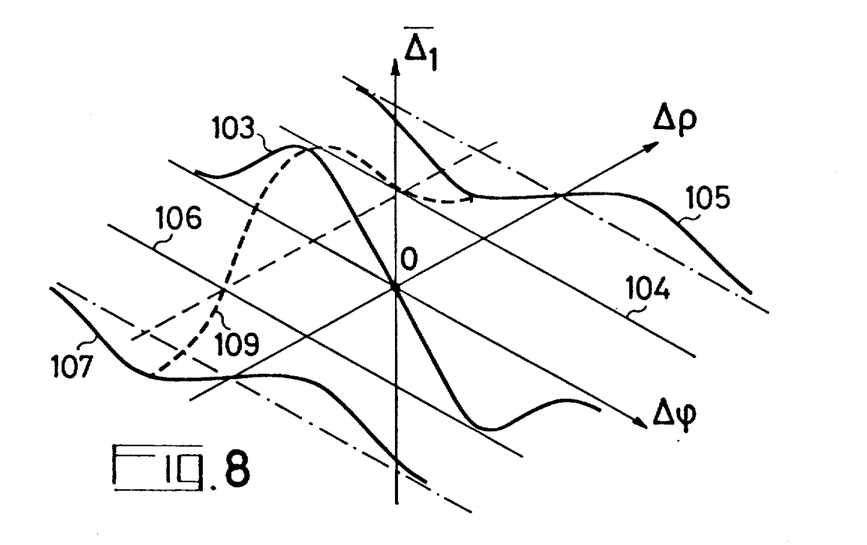

In FIG. 8, the discrimination curves pertaining to the signal $\overline{\Delta}_1$ have been illustrated for different values of the defocussing $\Delta\phi$ and the eccentricity $\Delta\rho$. For $\Delta\rho=0$, a discrimination curve 103 is obtained whose slope is strongly negative in the central zone passing through the origin 0. For particular positive and negative values of $\Delta\rho$, it will be observed that the discrimination curves 104 and 106 flatten out completely and for higher values of $\Delta\rho$ it will be seen that the discrimination curves 107 regain a positive slope. The curve 109 joining the peaks of the discrimination curves 103, 104, 105 and 106 and 107 exhibits a peak at $\Delta\rho=0$ and oscillates to either side of this peak. It will be seen that feed back control of the focussing could readily become unstable or non-existent beyond a given value of the track-following error.

However, since the track-following control function is effective in all circumstances, it is ensured that the error $\Delta\rho$ is maintained close to zero. Control of focussing is therefore performed in a stable and efficient way as soon as the track-following condition has been acquired.

In the foregoing description, we have dealt with the case of read-out by transmission across a transparent data carrier containing a relief impression. If the data carrier is of non-uniform transparency kind, the operation of the read-out system shown in FIG. 1 remains unchanged. It is worthy of note that the read-out signal proper is present in the signals $S_1$ and $S_2$ in the form of a squarewave carrier which is angularly modulated. The read-out signal can be picked off by adding the signals $S_1$ and $S_2$. However, in a preferred embodiment the filters 17 and 18 can be arranged at the respective outputs of the adder 19 and the subtractor 20 so that the demodulators 21 and 22 only receive the low-frequency components corresponding to the error signals $\overline{\Delta}_1$ and $\overline{\Sigma}_1$. In this variant embodiment, the read-out signal is available at the output of the adder 19 where it can be filtered by means of a supplementary filter selectively transmitting the spectrum of the read-out signal. The frequency of oscillation of the mirror 11 is shown so that it produces no interference with the read-out signal cut in the data carrier 5. The two photo-detector elements 8 and 9 can be replaced by two photo-detectors performing the same function in a larger system, one using four cells, for example.

In addition, without departing from the scope of the present invention, the read-out system of FIG. 1 can be adapted to the situation in which read-out is performed by reflection using the data carrier containing a relief impression or provided with a layer having a non-uniform reflection coefficient.

Figure 6:
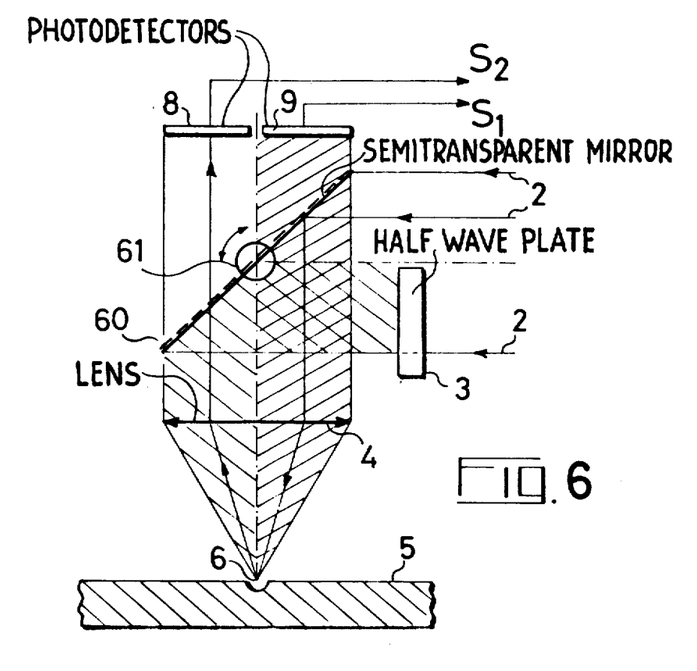
FIG. 6 illustrates a variant embodiment of the read-out system in accordance with the invention.

In FIG. 6, a data carrier 5 can be seen whose reflective surface for example carries the engraved impression of a track 6. To read-out the track 6 by reflection and produce the signals $\overline{\Delta}_1$ and $\overline{\Sigma}_1$ for the error measuring function, the reader head comprises an oscillating mirror 60 whose semi-reflective face directs onto a projection lens 4 the incident radiation 2. The read-out beam 2 is split into two half-beams one of which has been cross-hatched in FIG. 6. In accordance with the invention, a half-wave plate 3 is arranged in the path of the cross-hatched half-beam in order to produce the optical splitting referred to earlier. The reflected light from the data carrier 5 successively passes across the objective lens 4 and the oscillating mirror 60 towards the two photo-detector elements 8 and 9 which furnish the signals $S_1$ and $S_2$. Oscillation of the mirror 60 takes place around an axis 61 perpendicular to the plane of FIG. 6 so that the read-out spot oscillates transversely in relation to the track 6 whose longitudinal axis is also perpendicular to the plane of FIG. 6. It will be observed that radiation reflected by the data carrier 5 and transmitted by the objective lens 4 is partly returned towards the light source. However, that fraction thereof which has to return across the plate 3 cannot in fact pass across the plate in the reverse direction, and vice versa. The radiation returned towards the source cannot therefore interfere with the radiation supplied from the source so that any unwanted effect in the form of an optical hiatus between the exit face of the read-out light source and the reflective surface being read-out, is avoided. This optical decoupling, which is highly effective, is also achieved in the case shown in FIG. 1.

What we claim is:

1. A system for reading out a record by point optical scanning of a diffractive track carried by said record, and along which information items are transcribed, said system comprising: means causing said record to displace in front of a read-out head, said read-out head comprising a source furnishing monochromatic radiation, and optical means focussing said monochromatic radiation for forming a read-out beam; said read-out beam having a point of convergence positioned close to the optical axis of said optical means and in immediate proximity of the element of said diffractive track being read at the time; said read-out head further comrpising at least two photodetector elements picking up the radiation emerging from the illuminated portion of said diffractive track; said system further comprising deflection means for deflecting said read-out beam positioned between said source and said record for causing said point of convergence to displace transversely in relation to the longitudinal axis of said diffractive track; a half-wave plate intercepting one of the halves of said read-out beam; said halves being generated by said half wave plate, and obtained by partitioning said read-out beam with a plane containing said optical axis and perpendicular to the direction of displacement of said point of convergence; an electrical generator being connected to said deflection means for imparting to said point of convergence an oscillatory motion; synchronous detector means being connected to said electrical generator and to said photodetector elements for supplying signals representing positional errors on the part of said point of convergence, in relation to said longitudinal axis.

2. A system as claimed in claim 1, wherein said deflection means comprise, between said source and said optical means, an oscillating mirror for deflecting said monochromatic radiation; said oscillating mirror pivoting about an axis perpendicular to said optical axis and contained in the plane separating said halves from one another.

3. A system as claimed in claim 2, wherein said oscillating mirror is a semi-transparent plate.

4. A system as claimed in claim 1, wherein the direction of displacement of said point of convergence is perpendicular to the longitudinal axis of said track.

5. A system as claimed in claim 1, wherein the direction of polarization of said monochromatic radiation coincides with one of the bisectors of the neutral axes of said half-wave plate.

6. A system as claimed in claim 1, wherein said photodetector elements pick up the radiation fractions coming from said record; the radiation fraction contained in one of said beam halves impinging on only one of said photodetector elements and the radiation fraction contained in the other of said beam halves impinging on only the other of said photodetector elements.

7. A system as claimed in claim 6, wherein said synchronous detector means comprise two synchronous detectors whose first inputs are connected to the output of said electrical generator and whose second inputs are connected respectively to an adder circuit and to a subtractor circuit; said adder circuit and said subtractor circuit respectively receiving the signals furnished by said photo-detector elements.

8. A system as claimed in claim 7, wherein at least two feed back loops respectively controlled by the signals furnished by said synchronous detectors, act upon the focussing and position of said read-out beam, thereby maintaining said point of convergence in coincidence with the surface containing the diffractive track, and ensuring appropriate tracking of said track.

9. A system as claimed in claim 1, wherein the frequency of said oscillatory motion is made sufficiently low for avoiding any interference with the read-out signal transcribed along said diffractive track; filter means ensuring decoupling between the signals resulting from said oscillatory motion and the read-out signal proper.

10. A system as claimed in claim 1, wherein said photo-detector elements and said source are located at one and the same side of said record.

11. A system as claimed in claim 1, wherein said record is located between said photo-detector elements and said source.

* * * * *